Figure 1:
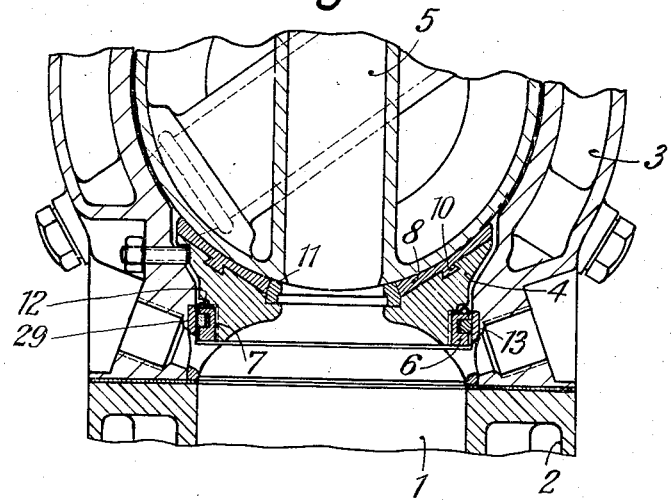

May 2, 1939.  A. BAER  2,156,960

SEAL FOR ROTARY VALVES OF INTERNAL COMBUSTION ENGINES

Filed April 16, 1938  2 Sheets-Sheet 1

Inventor:
A. Baer
By Glascock Downing Seebold
Attys.

May 2, 1939.  A. BAER  2,156,960
SEAL FOR ROTARY VALVES OF INTERNAL COMBUSTION ENGINES
Filed April 16, 1938  2 Sheets-Sheet 2
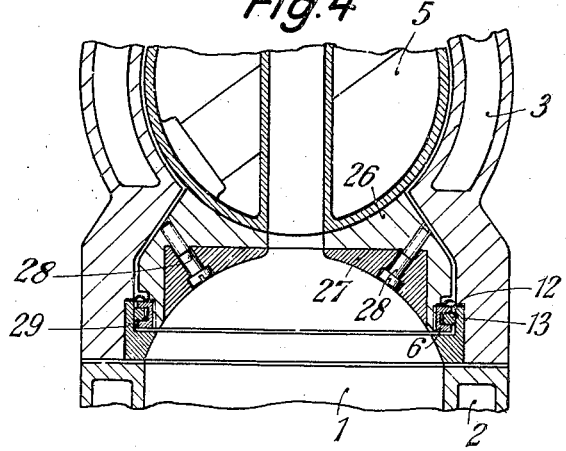
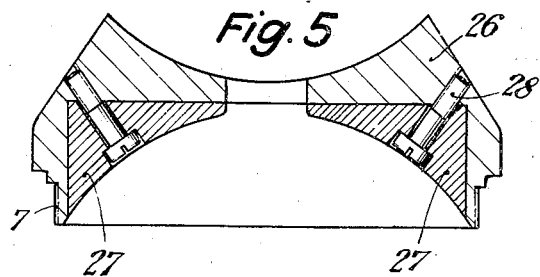
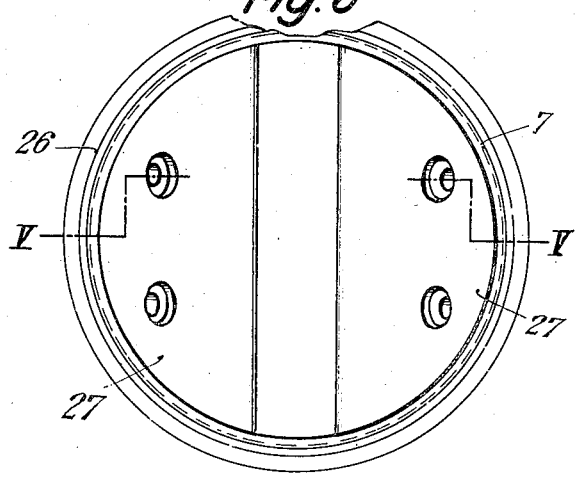
Inventor:
A. Baer
By: Glascock Downing &Seebold
Attys Patented May 2, 1939

2,156,960

UNITED STATES PATENT OFFICE 2,156,960

SEAL FOR ROTARY VALVES OF INTERNAL COMBUSTION ENGINES

Alfred Baer, Berlin-Schmargendorf, Germany

Application April 16, 1938, Serial No. 202,544
In Germany November 2, 1935

6 Claims. (Cl. 123—190)

My invention relates to a seal for rotary valves of internal combustion engines. Rotary valves are provided for admitting the mixture of fuel and air, and for discharging the exhaust gas. The seal is arranged intermediate the rotary valve and the cylinder to which it is allotted, and must, under all conditions of operation, make a tight fit with the cylindrical perimeter of the rotary valve.

It has been found to be difficult in practice to obtain the required tight fit. The seal is heated to very high temperature by the products of combustion at the side which faces the cylinder while at its sealing surface it is subjected to a lower temperature by the—cooled—rotary valve. This unequal temperature causes warping of the sealing member, and the degree of warping is determined by the varying performance of the engine. If the seal makes a tight fit with the valve at high performance, and consequently high temperature, this will not be so at lower performance, and lower temperature, and the efficiency of the engine is deteriorated by the leakage loss between the valve and the sealing member.

It is an object of my invention to provide a sealing member in which the abovesaid drawback is eliminated.

To this end, I make the sealing member of a part which engages the valve, and a part which faces the cylinder, and I provide means for controlling the heat flow between the parts so that the flow of heat from the hotter part which faces the cylinder, to the cooler part of the sealing member which engages the valve, is obstructed and so the temperature gradient is not as high in my divided sealing member as in the known undivided members.

The control of the heat flow between the parts of the sealing member can be effected in various ways, as will be fully understood from the following specification, with reference to the accompanying drawings in which two types of sealing members embodying my invention are illustrated by way of example.

In the drawings

Figure 2:
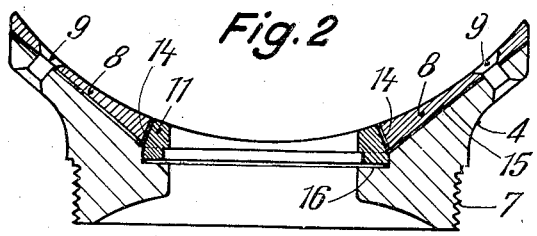
Figure 3:
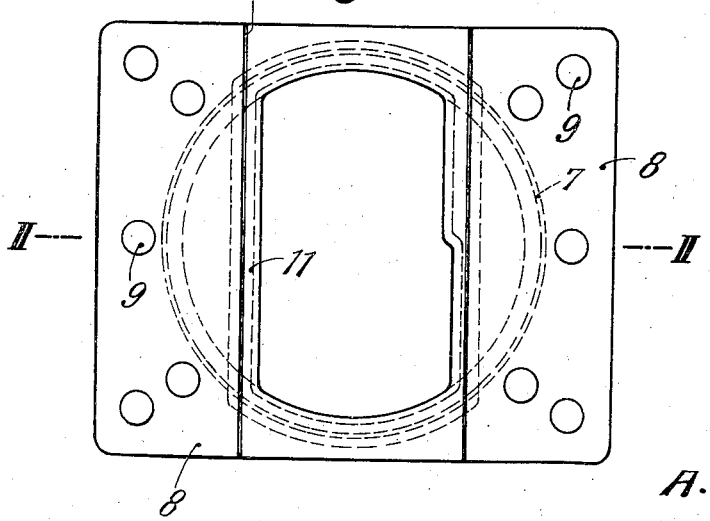

Figs. 1, 2, and 3 illustrate a sealing member in which the heat control is effected by providing clearances between the parts of the member.

Figs. 4, 5, and 6 illustrate a sealing member in which the control is effected by making the parts of materials possessing different heat conductivities.

More particularly,

Fig. 1 is a section on the axis of the cylinder to which the first-mentioned sealing member is allotted, Fig. 2 shows the member separately, drawn to a larger scale and in section on the line II—II in Fig. 3, Fig. 3 is a plan view of the member, Fig. 4 is a section similar to that in Fig. 1 but shows the second-mentioned sealing member, Fig. 5 is a section on the line V—V in Fig. 6, drawn to a larger scale, and Fig. 6 is a plan view of the member, viewed from below.

Referring now to the drawings, 1 is the upper end of an internal combustion cylinder, 2 is its jacket, 3 is the cylinder head, also equipped with a cooling jacket, and 5 is a rotary valve in the cylinder head 3.

A divided sealing member is arranged intermediate the valve 5 and the cylinder 1. It has the shape of an inverted cup, with a threaded spigot 7 at its lower end. Secured on the spigot is a grooved ring 6 whose upper end forces the inner portion of a resilient washer 12 against a shoulder on the sealing member. A hollow cylinder 29 supported on the cylinder 1 forces the outer portion of the washer 12 against a shoulder on the cylinder head 3. A piston ring 13 inserted in the grooved ring 6 and sliding on the inner wall of the hollow cylinder 29, protects the washer 12 against the attack of the combustion gases. By these means, an absolutely tight and yet resilient closure of the cylinder is effected which does not interfere with the easy movement of the sealing member necessary for proper engagement with the valve 5.

Referring now to Figs. 1, 2, and 3, the part of the sealing member which faces the cylinder 1 is a body 4, with the spigot 7 at its lower end, as described. Bearing strips 8, with their upper surfaces curved to the radius of the rotary valve 5, are secured to the body at its top and at opposite sides of its central port, and held by suitable means, such as dovetails 10, Fig. 1, or rivets 9, Fig. 2. Inserted between the strips 8 is a frame 11 of refractory material for protecting the control edges against the attack of the combustion gases.

In the sealing member which has been described, the flow of heat is controlled, i. e., the heat transfer from the lower face of the body 4, the hottest region of the sealing member, to the cooler parts, i. e., the strips 8 and the frame 11 which engage the rotary valve 5, is obstructed by providing clearances between the parts of the sealing member, and between such parts and the frame. Thus, a clearance 15 is arranged between each of the strips 8 and the body 4; clearances 14 are arranged between the inner ends of the strips 8 and the sides of the frame 11; a clearance 16 is arranged between the frame 11 and the lugs of the body 4 which support it. The clearances have been omitted in Fig. 1 on account of its small scale but are clearly shown in Fig. 2. By obstructing the heat flow, they avoid warping of the sealing member and make it more fit for its purpose.

The conditions by which the heat conductivity of the materials for the parts making up the sealing member are determined, vary with the working principle of the engine. For Diesel engines, the sealing member should act as a heat accumulator. The part of the member which engages the valve 5, i. e., the strips 8 and the frame 11, is made of metal such as cast iron or steel, and the part which faces the cylinder, i. e., the body 4, is made of a poor heat conductor, such as porcelain or soapstone. On the other hand, for engines working on the explosion, or Otto, principle, the sealing member should be a good heat conductor, and so the part which engages the valve is made of a material having normal heat conductivity, such as iron or steel, as for the Diesel engine, but the part which faces the cylinder is made of a material of extra high conductivity, such as aluminium bronze.

It is understood that the heat flow can be controlled either by providing the clearances 14, Fig. 2, by themselves, or by providing the clearances and making the parts of materials having different heat conductivity, or by dispensing with the clearances and only making the parts of such materials.

Referring now to Figs. 4, 5, and 6, the sealing member and its accessories are arranged as described with reference to Figs. 1, 2, and 3, but in this instance the strips 8 are dispensed with and the body 26 of the sealing member engages directly the valve 5. Blocks 27, of substantially triangular cross-section, are inserted in the cavity of the body 26, and held by screws 28.

For the reasons stated, the parts of the sealing member are made of materials having different heat conductivity. The body 26 must obviously be made of metal, such as cast iron, steel, or the like. For a Diesel engine, the insertions 27 are made of a poor conductor, such as porcelain, soapstone, or the like. For an engine working on the explosion principle, the insertions are made of a good conductor, such as aluminium bronze, gray cast iron, or the like.

It is understood that the insertions 27 may be arranged with a clearance against the body 26, for the purpose specified.

I claim:

1. In a seal for rotary valves of internal combustion engines, a cylinder, a rotary valve allotted to the cylinder, a divided sealing member arranged intermediate the valve and the cylinder, a pair of bearing strips in the sealing member which engage the valve, a frame between the bearing strips, and a body in the sealing member which faces the cylinder and supports the strips and the frame; the bearing strips, the frame, and the body being arranged with clearances at their points of connection.

2. In a seal for rotary valves of internal combustion engines, a cylinder, a rotary valve allotted to the cylinder, a divided sealing member arranged intermediate the valve and the cylinder, a hollow body in the sealing member which engages the valve, blocks in the body which face the cylinder, and means for controlling the flow of heat between the body and the blocks.

3. In a seal for rotary valves of internal combustion engines of the Diesel type, a cylinder, a rotary valve allotted to the cylinder, a divided sealing member arranged intermediate the valve and the cylinder, a part in the sealing member which engages the valve being made of a material possessing normal heat conducivity, and another part which faces the cylinder being made of a material possessing poor heat conductivity.

4. In a seal for rotary valves of internal combustion engines of the Diesel type, a cylinder, a rotary valve allotted to the cylinder, a divided sealing member arranged intermediate the valve and the cylinder, a part in the sealing member which engages the valve being made of metal, and another part in the sealing member which faces the cylinder being made of a non-metallic poor heat conductor.

5. In a seal for rotary valves of internal combustion engines with combustion at constant volume, a cylinder, a rotary valve allotted to the cylinder, a divided sealing member arranged intermediate the valve and the cylinder, a part in the sealing member which engages the valve being made of a material possessing normal heat conductivity, and another part which faces the cylinder being made of a material possessing higher heat conductivity than that of the first-mentioned part.

6. In a seal for rotary valves of internal combustion engines with combustion at constant volume, a cylinder, a rotary valve allotted to the cylinder, a divided sealing member arranged intermediate the valve and the cylinder, a part in the sealing member which engages the valve being made of metal possessing normal heat conductivity, and another part which faces the cylinder being made of a metal possessing very high heat conductivity.

ALFRED BAER.